US010006662B2

(12) United States Patent
Haydock et al.

(10) Patent No.: US 10,006,662 B2
(45) Date of Patent: Jun. 26, 2018

(54) CONDENSING HEAT EXCHANGER FINS WITH ENHANCED AIRFLOW

(71) Applicant: Carrier Corporation, Farmington, CT (US)

(72) Inventors: Paul M. Haydock, Zionsville, IN (US); Larry D. Rieke, Zionsville, IN (US); Mathew S. Vargo, Indianapolis, IN (US)

(73) Assignee: CARRIER CORPORATION, Farmington, CT (US)

( * ) Notice: Subject to any disclaimer, the term of this patent is extended or adjusted under 35 U.S.C. 154(b) by 540 days.

(21) Appl. No.: 14/085,270

(22) Filed: Nov. 20, 2013

(65) Prior Publication Data
US 2014/0202442 A1 Jul. 24, 2014

Related U.S. Application Data

(60) Provisional application No. 61/754,810, filed on Jan. 21, 2013.

(51) Int. Cl.
*F24H 8/00* (2006.01)
*F28D 7/16* (2006.01)
*F28F 1/32* (2006.01)

(52) U.S. Cl.
CPC ........... *F24H 8/00* (2013.01); *F28D 7/16* (2013.01); *F28F 1/32* (2013.01); *F24D 2220/06* (2013.01); *Y02B 30/102* (2013.01)

(58) Field of Classification Search
CPC .......... F28F 1/128; F28F 1/325; F28F 13/003; F28D 2021/0084
See application file for complete search history.

(56) References Cited

U.S. PATENT DOCUMENTS

| | | | | | |
|---|---|---|---|---|---|
| 2,903,245 | A | * | 9/1959 | Kritzer | F28D 1/024 165/124 |
| 2,963,277 | A | * | 12/1960 | Heller | F28F 1/32 165/151 |
| 3,384,168 | A | * | 5/1968 | Richter | F24D 19/04 165/182 |
| 3,804,159 | A | * | 4/1974 | Searight | F28B 1/06 165/109.1 |
| 3,916,989 | A | * | 11/1975 | Harada | F28F 1/325 165/151 |
| 4,480,684 | A | * | 11/1984 | Onishi | F28F 1/325 165/110 |
| 4,860,725 | A | * | 8/1989 | Tallman | F24H 3/087 126/110 R |

(Continued)

FOREIGN PATENT DOCUMENTS

| JP | H08156568 A | 12/1994 |
|---|---|---|
| JP | H08327267 A | 5/1995 |

(Continued)

*Primary Examiner* — Jorge Pereiro
(74) *Attorney, Agent, or Firm* — Cantor Colburn LLP

(57) ABSTRACT

A plate fin for a heat exchanger is provided including a base plate having a plurality of holes formed therein. The plate fin also includes a plurality of generally annular collars. Each collar is positioned substantially coaxially within one of the plurality of holes. The plurality of first collars is substantially less than the plurality of holes such that a portion of the plurality of holes does not have a collar arranged therein.

15 Claims, 7 Drawing Sheets

(56) References Cited

U.S. PATENT DOCUMENTS

| | | | |
|---|---|---|---|
| 5,056,586 A * | 10/1991 | Bemisderfer | F28F 1/128 165/109.1 |
| 5,056,594 A * | 10/1991 | Kraay | F28F 1/325 165/151 |
| 5,076,353 A * | 12/1991 | Haussmann | F25B 39/04 165/110 |
| 5,178,124 A | 1/1993 | Lu et al. | |
| 5,203,403 A * | 4/1993 | Yokoyama | F28F 1/32 165/151 |
| 5,322,050 A | 6/1994 | Lu | |
| 5,385,137 A | 1/1995 | Christensen et al. | |
| 5,406,933 A * | 4/1995 | Lu | F24H 3/087 126/110 R |
| 5,437,263 A * | 8/1995 | Ellingham | F24H 3/105 126/110 AA |
| 5,540,276 A * | 7/1996 | Adams | F28F 1/32 165/150 |
| 5,791,404 A | 8/1998 | Bailey et al. | |
| 6,227,289 B1 * | 5/2001 | Yokoyama | F28F 1/325 165/135 |
| 6,352,208 B1 | 3/2002 | Shibata et al. | |
| 6,378,605 B1 * | 4/2002 | Kutscher | F28B 1/06 165/181 |
| 6,497,112 B1 | 12/2002 | Simeone et al. | |
| 6,513,587 B2 * | 2/2003 | Ali | B21D 53/08 165/151 |
| 6,644,389 B1 * | 11/2003 | Kang | F28F 1/325 165/146 |
| 7,063,131 B2 * | 6/2006 | Northrop | F28F 1/325 165/133 |
| 7,219,718 B2 | 5/2007 | Wanni et al. | |
| 7,721,794 B2 | 5/2010 | Heidenreich et al. | |
| 2005/0155750 A1 * | 7/2005 | Mitchell | F28F 1/32 165/182 |
| 2006/0016582 A1 * | 1/2006 | Hashimoto | F28D 7/1684 165/109.1 |
| 2006/0175047 A1 * | 8/2006 | Hattori | B21D 53/085 165/133 |
| 2011/0162385 A1 | 7/2011 | Kidambi et al. | |
| 2011/0185574 A1 | 8/2011 | Samuelson et al. | |
| 2012/0103583 A1 * | 5/2012 | Kim | F28D 1/05391 165/173 |
| 2012/0236499 A1 | 9/2012 | Murayama et al. | |
| 2013/0043013 A1 * | 2/2013 | Iino | F28D 1/05366 165/181 |
| 2015/0101362 A1 * | 4/2015 | Lee | F28D 1/05383 62/515 |

FOREIGN PATENT DOCUMENTS

| | | |
|---|---|---|
| JP | H10110961 A | 4/1998 |
| JP | H11237196 A | 8/1999 |
| JP | H11257879 A | 9/1999 |
| JP | H11281278 A | 10/1999 |
| JP | H11316035 A | 11/1999 |
| JP | 2000329378 A | 11/2000 |
| JP | 2006153334 A | 6/2006 |
| WO | 0167020 A1 | 9/2001 |

* cited by examiner

CONDENSING HEAT EXCHANGER FINS WITH ENHANCED AIRFLOW

CROSS-REFERENCE TO RELATED APPLICATIONS

This application claims the benefit of U.S. Provisional Patent Application Ser. No. 61/754,810, filed on Jan. 21, 2013, the entire contents of which are herein incorporated by reference.

BACKGROUND OF THE INVENTION

The invention relates generally to condensing furnaces, and more particularly, to a condensing heat exchanger of such condensing furnaces.

Conventional condensing furnaces include a primary heat exchanger and a condensing heat exchanger arranged adjacent one another and generally aligned with an air source. Air from the air source blows first across the outside of the condensing heat exchanger and then over the primary heat exchanger, such that heat transfer between the fluid in the heat exchangers and the air occurs through convection.

Forcing airflow through a condensing heat exchanger having a plate fin and tube construction requires a given amount of power consumption (watts) by the fan or other air source. To minimize the power drawn by the air source, the condensing heat exchanger may be widened to increase the area over which air from the air source flows. The size of the condensing heat exchanger is limited, however, because after passing over the condensing heat exchanger, the airflow subsequently flows over the adjacent primary heat exchanger, which has a more narrow flow profile. By increasing the width of the condensing heat exchanger relative to the primary heat exchanger, a wider distribution of the airflow will be achieved. This wider distribution of airflow will allow more air to pass around the outside of the primary heat exchanger such that the interior of the primary heat exchanger will have a higher temperature. Baffles can be added to the side of the primary heat exchanger to limit the amount of bypass airflow, but in exchange they will also increase power consumption from the air source. This increase in power consumption can negate the reduction in power consumption achieved by the widening of the condensing heat exchanger.

Construction of a plate fin and tube heat exchanger generally includes equally spaced tubes that lace through at least one plate fin. The holes in the plate fin have extruded collars to provide proper fin spacing and an increased area for heat transfer from the tube to the collar. The collars on the fins may encompass the entire length of the tubes by nesting with one another, and create a barrier to the airflow such that air has to divert around the tubes and collars to flow through the condensing heat exchanger coil. As a result of this increased resistance to the flow, the power consumption of air source is similarly increased.

BRIEF DESCRIPTION OF THE INVENTION

According to one embodiment of the invention, a plate fin for a heat exchanger is provided including a base plate having a plurality of holes formed therein. The plate fin also includes a plurality of generally annular collars. Each collar is positioned substantially coaxially within one of the plurality of first holes. The plurality of collars is substantially less than the plurality of holes such that a portion of the plurality of holes do not have a collar arranged therein.

According to one embodiment of the invention, a heat exchanger is provided including a plurality of heat exchanger tubes extending through at least one plate fin. The at least one plate fin includes a base plate having a plurality of holes formed therein. The plate fin also includes a plurality of collars configured to receive the heat exchanger tubes. Each collar is mounted substantially coaxially within one of the plurality of first holes. The plurality of collars is substantially equal to the plurality of heat exchanger tubes. The plurality of collars is substantially less than the plurality of holes such that a portion of the plurality of holes do not have a collar arranged therein.

According to another embodiment of the invention, a furnace is provided including a primary heat exchanger having at least one primary heat exchanger cell. A condensing heat exchanger is fluidly coupled with and positioned adjacent to the primary heat exchanger. The condensing heat exchanger includes a plurality of heat exchanger tubes. Each of the plurality of heat exchanger tubes extends through at least one plate fin. The at least one plate fin includes a base plate having a plurality of holes formed therein. The plate fin also includes a plurality of generally annular collars configured to receive the heat exchanger tubes. Each collar is positioned substantially coaxially within one of the plurality of first holes. The plurality of collars is substantially less than the plurality of holes such that a portion of the plurality of holes do not have a collar arranged therein. The furnace additionally includes a blower arranged generally linearly with the primary heat exchanger and the condensing heat exchanger such that air from the blower first passes over the condensing heat exchanger and subsequently passes over the primary heat exchanger.

According to yet another embodiment, a plate fin for a heat exchanger is provided including a base plate having a plurality of holes formed therein. The plurality of holes is grouped into a first portion and a second portion. The plurality of holes within each of the first portion and second portion are generally equidistantly spaced by a first distance. The first portion and the second portion are separated by a second distance. The second distance is greater than the first distance. The plate fin also includes a plurality of generally annular collars substantially equal to the plurality of holes. Each collar is position substantially coaxially within one of the plurality of first holes.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
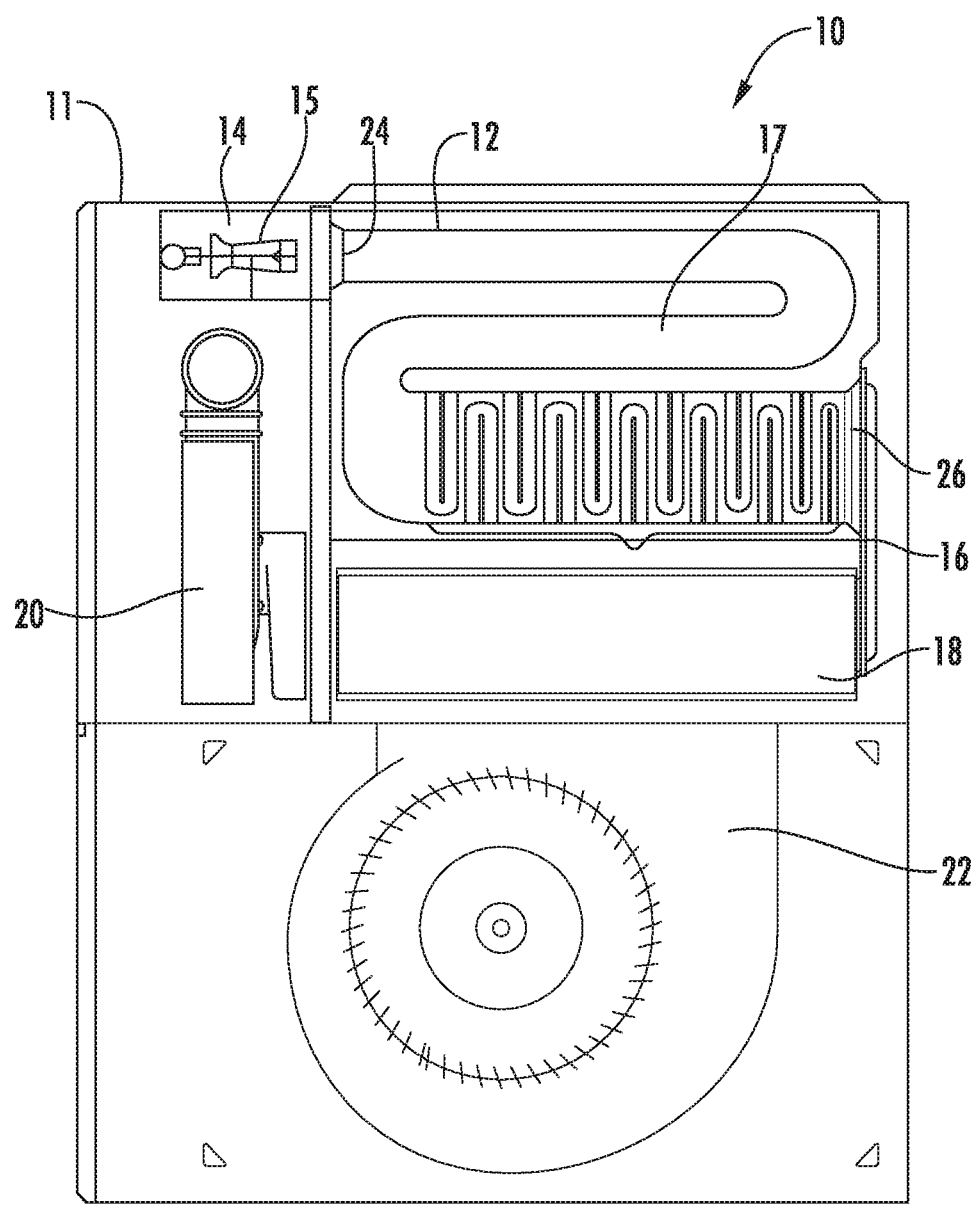
FIG. 1 is a perspective view, partially broken away, of an exemplary condensing furnace.

Referring now to FIG. 1, a condensing furnace 10 is illustrated. The condensing furnace 10 includes a cabinet 11 housing therein a burner assembly 14, primary heat exchanger 12, condensing heat exchanger assembly 18, induced draft motor assembly 20, and circulating air blower 22. The furnace 10 includes a vertical arrangement of the above major assemblies, and particularly the primary heat exchanger assembly 12, condensing heat exchanger assembly 18 and circulating air blower 22 in order to establish conditions to provide additional heat transfer and improve overall furnace efficiency by producing condensation in the condensing heat exchanger assembly 18.

Burner assembly 14 includes a plurality of inshot burners 15, one for each respective primary heat exchanger cell 17. Burners 15 receive fuel gas from the gas control assembly (not shown) and inject the fuel gas into respective primary heat exchanger inlets 24. A part of the injection process includes drawing combustion air into primary heat exchanger assembly 12 so that the fuel gas and air mixture may be combusted therein. It should be understood that the number of primary heat exchanger cells 17 and corresponding burners 15 is established by the required heating capacity of the furnace 10 and may vary.

Figure 2:
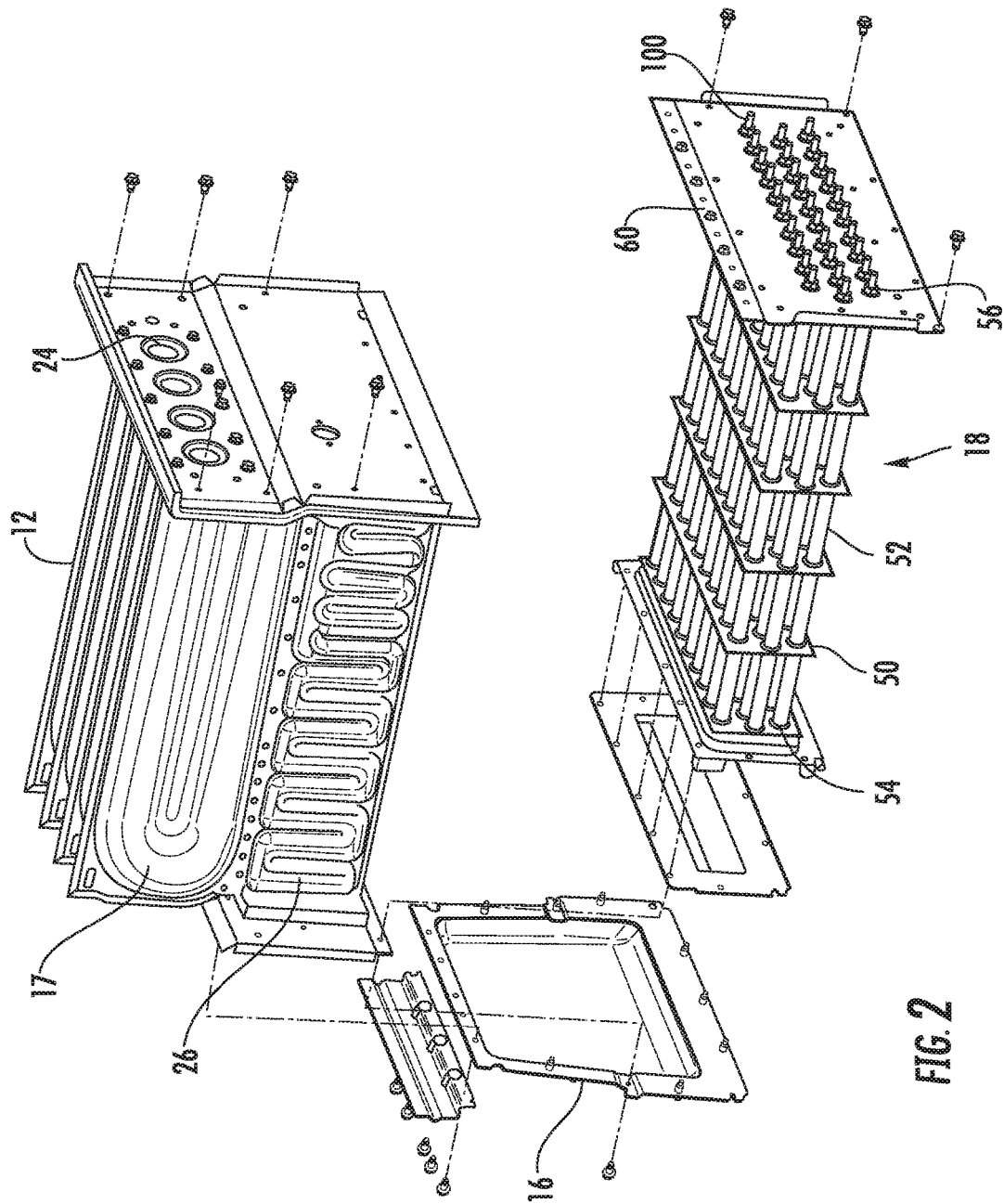
FIG. 2 is an exploded, perspective view of an exemplary heat exchanger assembly used in a condensing furnace.

Now referring to FIG. 2, each primary heat exchanger cell 17 has a serpentine flow path which connects the primary heat exchanger inlets 24 in fluid communication to respective primary heat exchanger outlets 26. As the combustion product exits the primary heat exchanger outlet 26, it flows into coupling box 16. Also connected to the coupling box 16, and in fluid communication therewith, is the condensing heat exchanger assembly 18 including a plurality of interconnected condensing heat exchanger tubes 52. Though the illustrated heat exchanger tubes 52 have a substantially circular cross-section, alternate configurations, for example having a rectangular or oval cross-section, are within the scope of the invention.

Each condensing heat exchanger tube 52 includes a respective condensing heat exchanger inlet 54 opening into coupling box 16 and a condensing heat exchanger outlet 56 opening into condensate collector (not shown) through apertures in mounting panel 60. Condensing heat exchanger outlets 56 deliver combustion product, for example flue gases and condensate, to the condensate collector (not shown). Further, there are a predetermined number of condensing heat exchanger tubes 52 for each primary heat exchanger cell 17, defined by the required furnace efficiency, flue side hydraulic resistance, air side hydraulic resistance, and combustion product mixture composition.

The induced draft motor assembly 20 (see FIG. 1) includes a motor with an inducer wheel (not shown) for inducing flow of the combustion product created by burner assembly 14 through primary heat exchanger assembly 12, coupling box 16, and condensing heat exchanger assembly 18, and thereafter exhausting the combustion product to a flue duct (not shown). A circulating air blower 22 delivers air, from the enclosure or space to be heated, in a flow direction generally perpendicular to the flow of the combustion fluid through condensing heat exchanger assembly 18 and primary heat exchanger 12. The cooler return air passing over the condensing heat exchanger assembly 18 lowers the temperature of the combustion product. This reduction in temperature of the combustion product below the condensate dew point causes a portion of the water vapor therein to condense, thereby recovering sensible and latent heat energy. The condensate formed within each individual condensing heat exchanger tube 52 flows out of outlet 56 through condensate collector (not shown). As circulating air blower 22 continues to force air over the outside of the condensing heat exchanger 18 and the primary heat exchanger 12, heat energy is transferred from the combustion product within the condensing and primary heat exchangers 18, 12 to the return air.

Figure 3:
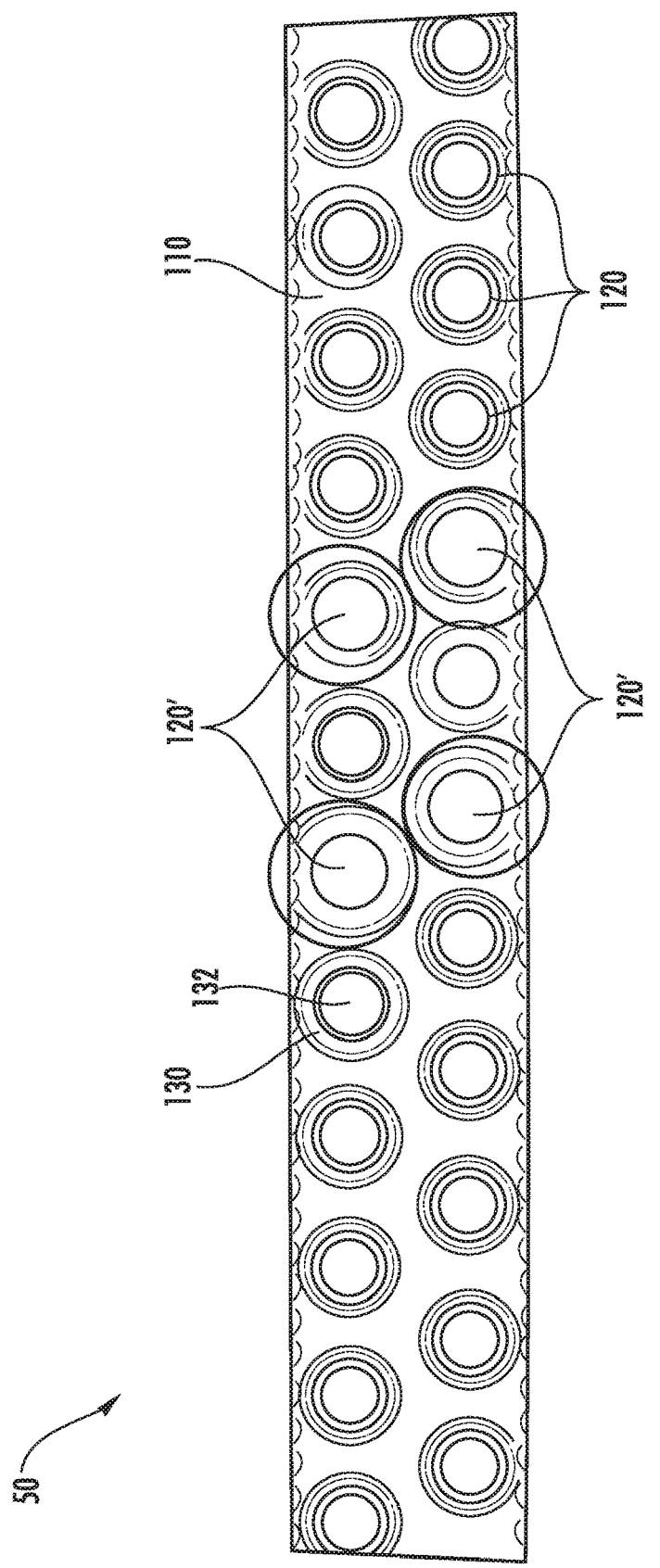
FIG. 3 is a front view of a plate fin for use in a condensing heat exchanger according to an embodiment of the invention.

Referring now to FIGS. 3-6, the condensing heat exchanger assembly 18 includes at least one plate fin 50 for improving the heat transfer between the airflow from the circulating air blower 22 and the combustion product flowing through the heat exchanger tubes 52. In embodiments including a plurality of plate fins 50, the plate fins 50 are substantially identical and are spaced at intervals along the length of the condensing heat exchanger tubes 52 between the inlet 54 and the outlet 56. Each plate fin 50 includes a generally thin base plate 110 constructed from a suitable thermally conductive material, such as aluminum or copper for example. A plurality of holes 120, each configured to receive a heat exchanger tube 52 extends through the thickness of the base plate 110. In one embodiment, the plurality of holes 120 is greater than the number of heat exchanger tubes 52 in the condensing heat exchanger assembly 18. The plurality of holes 120 may be substantially identical, or alternatively, may vary in size. In addition, the plurality of holes 120 may be arranged generally in columns and/or rows, such as in an alternating configuration, as illustrated in FIG. 3 for example.

Figure 4:
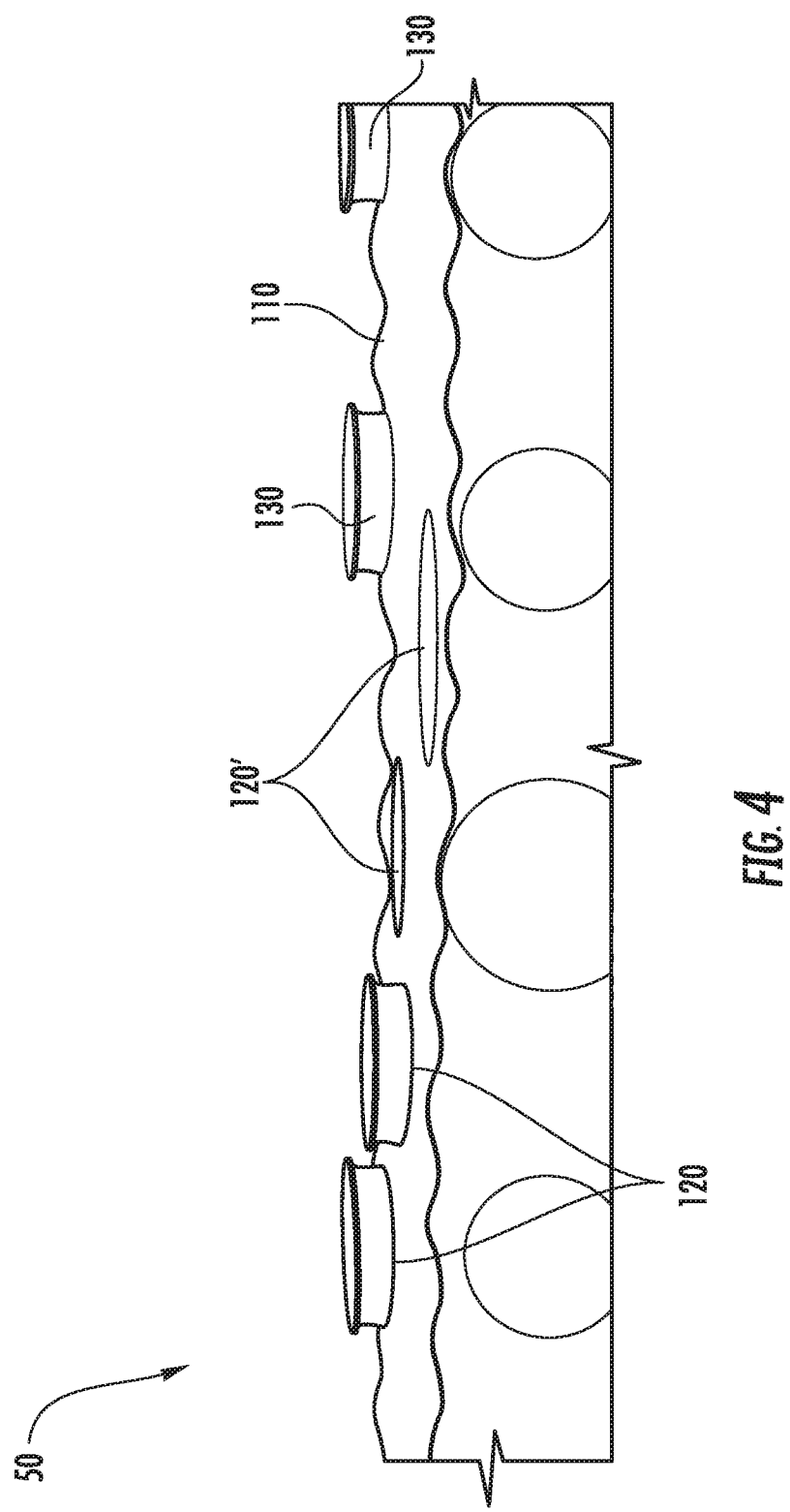
FIG. 4 is a side view of a plate fin for use in a condensing heat exchanger according to an embodiment of the invention.

The plate fin 50 additionally includes a plurality of generally annular collars 130, positioned within and aligned substantially coaxially with a portion of the plurality of holes 120 (best shown in FIG. 4). Each collar 130 extends beyond a front surface of the base plate 110. The collars 130 include a central hole 132 within which a heat exchanger tube 52 is received. Similar to the base plate 110 of the plate fin 50, the collars 130 are constructed from a suitable thermally conductive material using a known manufacturing process, such as extruding or machining for example. In one embodiment, the collars 130 are integrally formed with the plate fin 50 by extruding a portion of the base plate 110. In another embodiment, the collars 130 are formed separately and may be mechanically bonded to the base plate 110, such as through a brazing process for example, to increase the mechanical strength of the joint between the plate fin 50 and a heat exchanger tube 52 extending through the collar 130. The collars 130 are configured to increase the heat conductivity between the heat exchanger tubes 52 and the plate fin 50.

Figure 5:
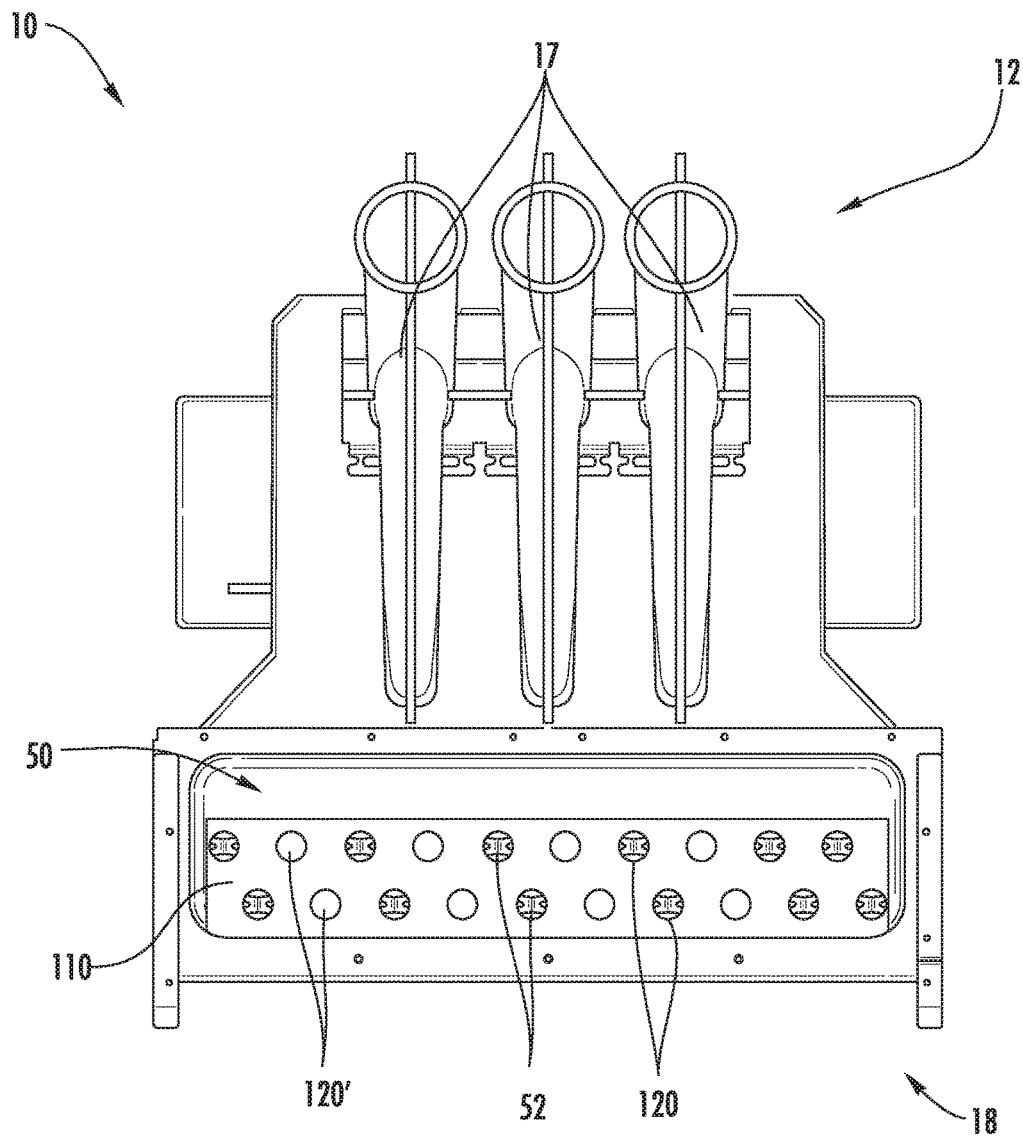
FIG. 5 is a side view of a condensing furnace according to an embodiment of the invention.
Figure 6:
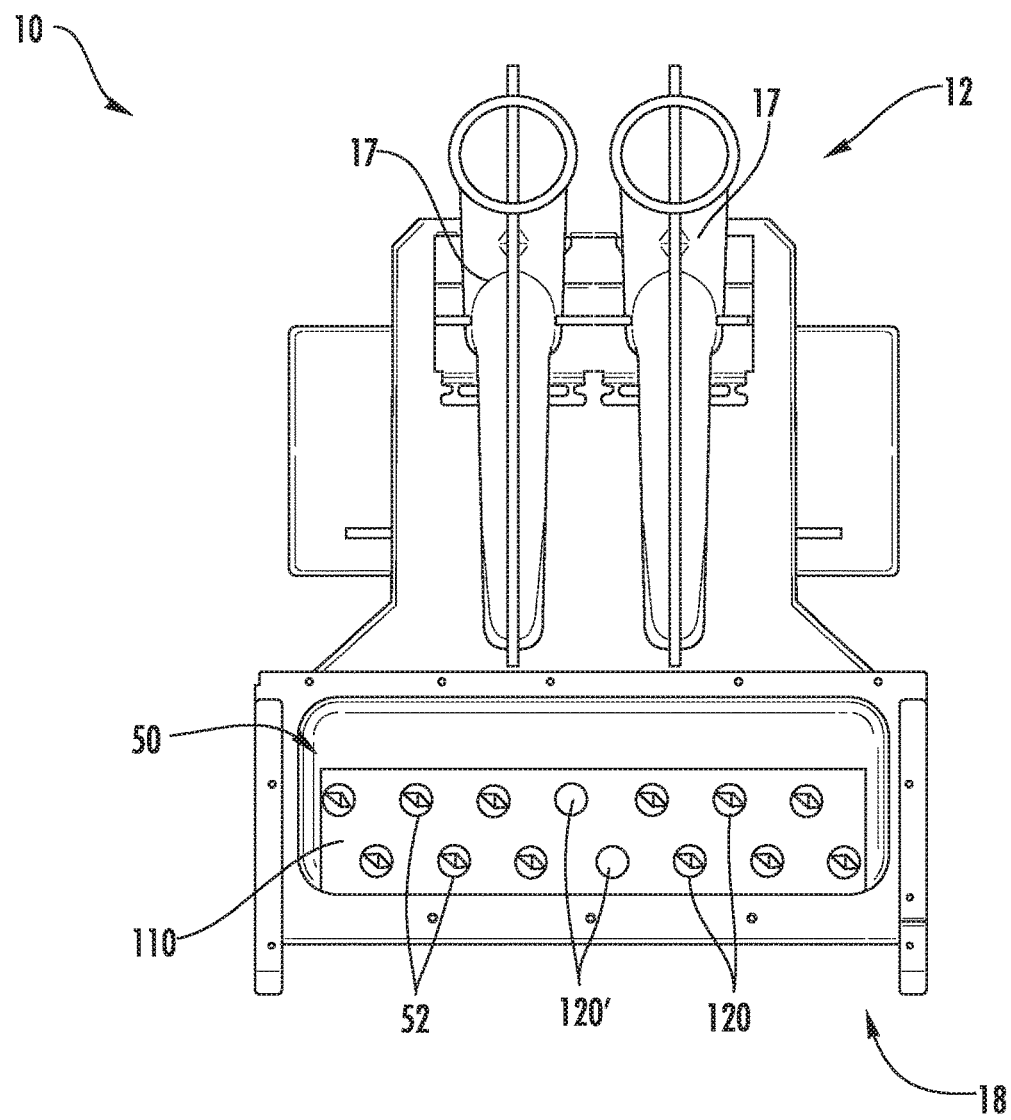
FIG. 6 is a side view of another condensing furnace according to an embodiment of the invention.

In one embodiment, the number of collars 130 is fewer than the number of holes 120 in the base plate 110, such that only a portion of the plurality of holes 120 have a collar 130 positioned therein. However, because each collar 130 is configured to receive a heat exchanger tube 52, the number of collars 130 is substantially equal to the number of heat exchanger tubes 52 in the condensing heat exchanger assembly 18. The holes 120 that do not have a collar 130 arranged therein (illustrated as 120') may be grouped or clustered adjacent one another to create a channel, and therefore an unrestricted flow path of air from the circulating air blower 22 (see FIG. 3). In addition, the holes 120' that do not have a collar 130 arranged therein may be located at any position on the base plate 110. For example, as shown in FIG. 5, clusters of holes 120' are spaced at intervals across the entire width of the base plate 110. In one embodiment, illustrated in FIG. 6, holes 120' are positioned to create an unrestricted flow path near the center of the base plate 110 or the interior of the heat exchanger 18. By positioning the holes 120' not having a collar 130 arranged therein adjacent the primary heat exchanger cells 17, the unrestricted flow may be directed towards the interior of the primary heat exchanger 12.

Figure 7:
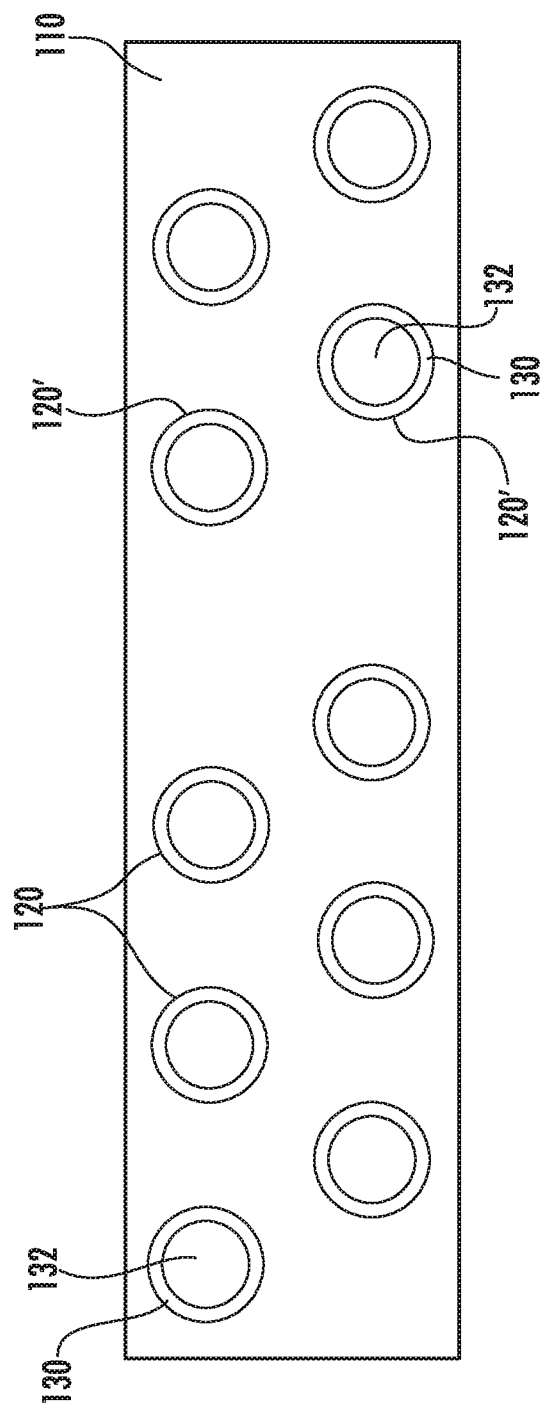
FIG. 7 is a front view of a plate fin for use in a condensing heat exchanger according to another embodiment of the invention.

In another embodiment, illustrated in FIG. 7, the plurality of holes 120 and the plurality of collars 130 of the plate fin 50 are substantially equal to the number of heat exchanger tubes 52 in the condensing heat exchanger assembly 18, such that each hole 120 has a collar 130 extending therefrom. The plurality of holes 120 are substantially equidistantly spaced about the surface of the base plate 110 in rows and columns. However, at least one of the plurality of holes (illustrated as 120') is spaced further from an adjacent hole 120 than the uniform, equidistant spacing to create an unrestricted flow path there between. In one embodiment, a plurality of non-uniformly spaced holes 120' are arranged generally linearly adjacent one another to create a flow path from a first edge of the base plate 110 towards the primary heat exchanger 12. The flow path may be near the center of the base plate 110 or the interior of the heat exchanger 18.

By reducing the number of heat exchanger tubes 52, and therefore heat exchanger collars 130 extending from the base plate 110 of a plate fin 50, the resistance to the airflow between adjacent heat exchanger tubes 52 is reduced. As a result, the power draw of the circulating air blower 22 also decreases. In addition, the position of the holes 120' may be used to manipulate the pattern of airflow through the condensing heat exchanger 18 towards a desired portion of the primary heat exchanger, such as the interior for example. By providing more airflow toward a selected portion of the primary heat exchanger coil 12, the temperature of the selected portion will decrease. Lower primary heat exchanger temperatures permit a broader operating range for a limit safety control application and improve the life of the heat exchangers 12, 18. The reduction in collars and heat exchanger tubes in the condensing heat exchanger tube assembly also reduces the material cost of the assembly.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A plate fin for a heat exchanger comprising:
   a base plate;
   a plurality of holes formed in the base plate, the plurality of holes being substantially identical and sized to receive a heat exchanger tube of the heat exchanger;
   a plurality of generally annular collars, each collar being positioned substantially coaxially within one of the plurality of holes, wherein the plurality of collars is substantially less than the plurality of holes such that a portion of the plurality of holes do not include collars, wherein each collar is sized to receive a heat exchanger tube and extends beyond a front surface of the base plate and an end of each collar is arranged substantially parallel to the front surface of the base plate, wherein the portion of the plurality of holes do not include collars form a fluid flow path across a surface of the plate fin.

2. The plate fin according to claim 1, wherein the plurality of collars are integrally formed with the base plate.

3. The plate fin according to claim 2, wherein the plurality of collars are formed as an extrusion of the base plate.

4. The plate fin according to claim 1, wherein the portion of the plurality of holes that does not include a collar is clustered.

5. The plate fin according to claim 1, wherein the portion of the plurality of holes that does not include a collar is arranged near a center of the base plate.

6. The plate fin according to claim 1, wherein the plurality of holes is arranged generally in columns and/or rows.

7. A heat exchanger comprising:
   a plurality of heat exchanger tubes having an inlet end and an outlet end, each of the plurality of heat exchanger tubes extends through at least one plate fin;
   at least one plate fin including:
      a plurality of substantially identical holes for receiving the plurality of heat exchanger tubes, wherein the plurality of holes is greater than the plurality of heat exchanger tubes; and
      a plurality of collars, each collar being associated with one of the plurality of holes including a heat exchanger tube, each collar being mounted substantially coaxially within one of the plurality of holes, wherein a portion of the plurality of holes does not have a collar and does not have a heat exchanger tube arranged therein and wherein each collar extends beyond a front surface of the base plate and an end of each collar is arranged substantially parallel to the front surface of the base plate, the portion of the plurality of holes that does not have a collar and does not have a heat exchanger tube arranged therein form a fluid flow path across a surface of the at least one plate fin.

8. The heat exchanger according to claim 7, wherein each one of the plurality of collars is integrally formed with the base plate.

9. The heat exchanger according to claim 8, wherein each one of the plurality of collars is formed as an extrusion of the base plate.

10. The heat exchanger according to claim 7, wherein the portion of the plurality of holes that does not include a collar is clustered.

11. The heat exchanger according to claim 7, wherein the portion of the plurality of holes that does not include a collar is arranged near a center of the base plate.

12. A furnace comprising:
   a primary heat exchanger having at least one primary heat exchanger cell;
   a condensing heat exchanger fluidly coupled with and positioned adjacent to the primary heat exchanger, the condensing heat exchanger including:
      a plurality of heat exchanger tubes, each one of the plurality of heat exchanger tubes extending through at least one plate fin;
   at least one plate fin, the at least one plate fin including:

a plurality of substantially identical holes formed therein for receiving the plurality of heat exchanger tubes, wherein the plurality of holes is greater than the plurality of heat exchanger tubes; and a plurality of collars each collar being mounted substantially coaxially within one of the plurality of holes and one of the plurality of heat exchanger tubes, wherein the plurality of collars is substantially less than the plurality of holes such that a portion of the plurality of holes does not have a collar and does not have a heat exchanger tube arranged therein, wherein each collar extends beyond a front surface of the base plate and an end of each collar is arranged substantially parallel to the front surface of the base plate, the portion of the plurality of holes that does not have a collar and does not have a heat exchanger tube arranged therein form a fluid flow path across a surface of the plate fin; and a circulating air blower arranged such that air from the circulating air blower first passes over the condensing heat exchanger and subsequently passes over the primary heat exchanger via the fluid flow path.

13. The furnace according to claim 12, wherein the portion of the plurality of holes that does not have a collar arranged therein is clustered to create at least one channel having a relatively unrestricted flow path for the air from the blower.

14. The furnace according to claim 12, wherein the portion of the plurality of holes that does not have a collar arranged therein is positioned adjacent to the at least one primary heat exchanger cell.

15. The furnace according to claim 12, wherein the condensing heat exchanger includes a plurality of substantially identical plate fins.

* * * * *